April 22, 1952  J. C. MITCHELL  2,593,783
FISHING ROD HOLDER
Filed Oct. 22, 1948
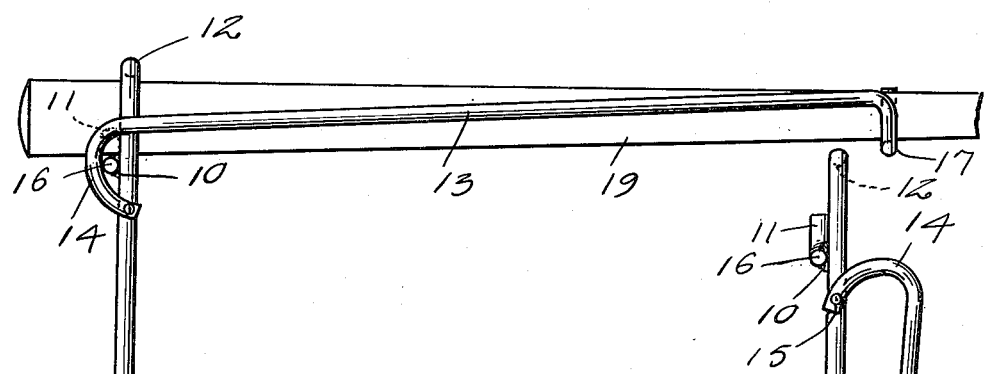
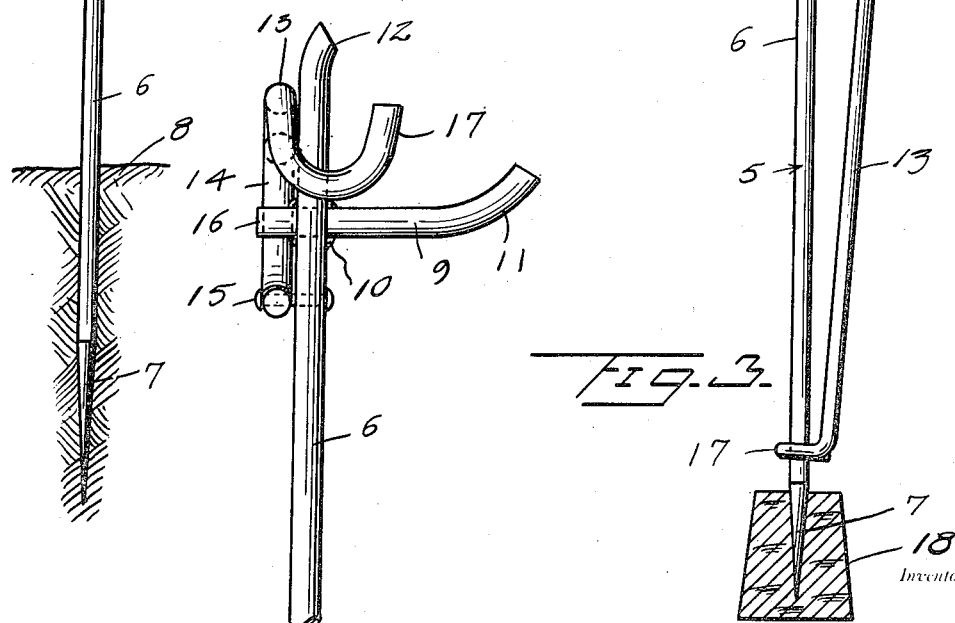
Jesse C. Mitchell
By John N. Randolph
Attorney Patented Apr. 22, 1952

2,593,783

UNITED STATES PATENT OFFICE 2,593,783

FISHING ROD HOLDER

Jesse C. Mitchell, Seven Mile, Ohio

Application October 22, 1948, Serial No. 55,939

5 Claims. (Cl. 248—38)

1

This invention relates to a novel holder for fishing rods which is adapted to be supported in the ground and which is adapted to be engaged by the butt end of a fishing rod for supporting the fishing rod above the ground and out of contact therewith to enable a fisherman to fish simultaneously with two fishing rods or poles or for providing a temporary support for a fishing rod to maintain it off of the ground while the fisherman is baiting hooks, lighting a cigarette or otherwise engaged.

Another object of the invention is to provide a fishing rod holder which may be utilized either with fishing rods equipped with reels or with fishing poles not utilizing a reel.

A further object of the invention is to provide a fishing rod holder of extremely simple construction which may be readily folded when not in use for storage in a fishing kit and which requires no latch mechanism or other complicated means for retaining the holder in an extended, operative position.

Various other objects and advantages of the invention will hereinafter become more fully apparent from the following description of the drawing, illustrating a preferred embodiment thereof, and wherein:

Figure 1 is a side elevational view showing the fishing rod holder in an extended position and applied to a fishing rod or pole;

Figure 2 is an end elevational view of the upper portion of the fishing rod holder looking from right to left of Figure 1 and with the fishing rod removed, and Figure 3 is a side elevational view showing the fishing rod holder in a folded position.

Referring more specifically to the drawing, the fishing rod holder in its entirety is designated generally 5 and includes a rod 6 having a tapered pointed end 7 which is adapted to be driven into the ground as indicated at 8 in Figure 1 for supporting the rod 6 in substantially an upright position and with the major portion of the rod extending upwardly from the ground surface.

A short rod 9 is secured by welding as indicated at 10 in cross relationship to the rod 6 near the opposite end of said rod 6 and near one end of the cross rod 9. The terminal portion of the longer end of the cross rod 9 is curved upwardly as indicated at 11 and the last mentioned or upper end of the rod 6, as indicated at 12, is curved in a direction toward the upturned end 11 so that the upper portion of the rod 6 and the longer end of the cross rod 9 combine to form a notch

2 which opens generally upwardly and at an oblique angle.

The fishing rod holder 5 also includes a rod 13 having a hook-shaped end 14 the terminal portion of which is pivotally connected to the rod 6 by a rivet or double headed pin 15 which extends therethrough and through the rod 6 below and adjacent the cross rod 9 and which is disposed substantially parallel to the cross rod 9. The hook-shaped rod end 14 is disposed on the same side of the rod 6 as the shorter end 16 of the cross rod 9, for a purpose which will hereinafter become apparent. The opposite end of the rod 13 is bent to provide a downwardly offset upwardly opening yoke 17 which is disposed in a plane substantially at a right angle to the axis of the rod 13.

Figure 3 illustrates the fishing rod holder 5 in a folded position for storage and with the rod 13 extending longitudinally of the rod 6 and with its yoke portion 17 engaging the rod 6 adjacent the tapered end 7. The tapered end 7 may be driven into a cork 18 to form a guard for said end while the holder 5 is stored. To move the fishing rod holder 5 to an extended position, the rod 13 is swung in a clockwise direction relatively to the rod 6 on its pivot 15 from its position of Figure 3 to its position of Figure 1, in which latter position the inner side of the hook portion 14 will engage against the rod end 16 which thus forms a stop for the rod 13 for supporting it in an extended position substantially at a right angle to the rod 6. After removing the cork 18, the tapered end 7 is then driven into the ground as indicated at 8 in Figure 1 for supporting the rod 6 in substantially an upright position. A fishing rod or pole 19 may then be inserted into the upwardly opening yoke 17 and the notch formed by the upper end of the rod 6 and the longer end of the cross rod 9 so that said yoke and notch will engage longitudinally spaced portions of the fishing rod or pole 19. The said notch engages the rod or pole adjacent its larger or butt end while the yoke 17 engages a portion of the rod or pole of smaller diameter and it will be readily apparent that after the rod or pole has been applied it may be longitudinally displaced in the notch and yoke until it is slightly wedged in one or the other of said portions. Likewise, said notch and yoke may engage a fishing rod having a detachable butt section and with a portion of the butt engaged in said notch and with the yoke 17 engaging the fishing rod just forward of the butt.

Various modifications and changes are contemplated and may obviously be resorted to, without departing from the spirit or scope of the invention as hereinafter defined by the appended claims.

I claim as my invention:

1. A fishing rod holder comprising a rod having a pointed end adapted to be driven into the ground for supporting said rod in substantially an upright position, a cross rod secured to the first mentioned rod adjacent its opposite, upper end, said cross rod being secured in cross relationship adjacent one end thereof to the first mentioned rod and having the longer end combining with the upper end of the first mentioned rod to form a notch for detachably receiving the butt end of a fishing rod or pole, and a rod swingably connected to the first mentioned rod beneath and adjacent the cross rod, said last mentioned rod having a hook-shaped end provided with a terminal portion pivotally connected to the first mentioned rod and disposed on the same side thereof as the other, shorter end of said cross rod, said shorter end of the cross rod forming a stop for limiting the swinging movement of the last mentioned rod in one direction and for engagement with the hook portion thereof for supporting said last mentioned rod in an extended position substantially at a right angle to the first mentioned rod, and said last mentioned rod having an upwardly opening yoke portion for engagement with another portion of the fishing rod or pole to combine with said cross rod for supporting the pole or fishing rod.

2. A fishing rod holder as in claim 1, the longer end of said cross rod having an upwardly curved terminal portion.

3. A fishing rod holder as in claim 1, the longer end of said cross rod having an upwardly curved terminal portion, the upper end of said first mentioned rod being curved in a direction toward said terminal portion and away from said swingably mounted rod.

4. A fishing rod holder as in claim 1, the free end of the swingably mounted rod having a downwardly offset substantially U-shaped portion disposed with its plane substantially at a right angle to the axis of the swingably mounted rod and forming said yoke portion, and said swingably mounted rod being swingable on its pivot from an extended position to a position substantially longitudinally of the first mentioned rod, and said yoke portion engaging the first mentioned rod adjacent its pointed end for limiting the swinging movement of the last mentioned rod in said last mentioned direction.

5. A fishing rod holder comprising an elongated substantially straight rod forming a supporting standard adapted to be disposed in substantially an upright position, a second rod having a hook-shaped end, the terminal portion of the hook-shaped end being pivotally connected to the standard near the upper end of the standard, a cross rod secured to the standard above said pivot and crosswise thereof, one end of the cross rod engaging said hook-shaped end for supporting the second rod at substantially a right angle to the standard, the free end of the second rod having an upwardly opening yoke to receive a portion of a fishing rod or pole and the opposite end of the cross rod and the upper end of the standard combining to form a notch for engaging and supporting another portion of the fishing rod or pole.

JESSE C. MITCHELL.

REFERENCES CITED

The following references are of record in the file of this patent:

UNITED STATES PATENTS

| Number | Name | Date |
| --- | --- | --- |
| 348,062 | Shelton | Aug. 24, 1886 |
| 2,137,645 | Doench | Nov. 22, 1938 |

FOREIGN PATENTS

| Number | Country | Date |
| --- | --- | --- |
| 557,514 | France | Aug. 10, 1923 |
| 596,336 | France | Oct. 21, 1925 |